(12) United States Patent  
Sexton et al.

(10) Patent No.: US 8,626,320 B2  
(45) Date of Patent: Jan. 7, 2014

(54) PROCESS CONTROL METHOD

(76) Inventors: Timothy Sexton, County Louth Dundalk (IE); Eoai Keogh, County Dublin Howth (IE)

( * ) Notice: Subject to any disclaimer, the term of this patent is extended or adjusted under 35 U.S.C. 154(b) by 1084 days.

(21) Appl. No.: 12/300,815

(22) PCT Filed: May 14, 2007

(86) PCT No.: PCT/EP2007/054634  
§ 371 (c)(1),  
(2), (4) Date: Aug. 21, 2009

(87) PCT Pub. No.: WO2007/131984  
PCT Pub. Date: Nov. 22, 2007

(65) Prior Publication Data  
US 2010/0017036 A1    Jan. 21, 2010

(30) Foreign Application Priority Data  
May 15, 2006    (IE) .................................. S2006/0391

(51) Int. Cl.  
*G05B 19/42*    (2006.01)

(52) U.S. Cl.  
USPC .......................................................... 700/87

(58) Field of Classification Search  
USPC ................. 700/9, 19, 23–25, 27, 87  
See application file for complete search history.

(56) References Cited

U.S. PATENT DOCUMENTS

| | | | | |
|---|---|---|---|---|
| 2003/0005099 | A1* | 1/2003 | Sven et al. | 709/223 |
| 2005/0157543 | A1 | 7/2005 | Masuda et al. | |
| 2005/0159835 | A1* | 7/2005 | Yamada et al. | 700/109 |

FOREIGN PATENT DOCUMENTS

| | | |
|---|---|---|
| DE | 19910536 A1 | 9/2000 |
| DE | 10007826 A1 | 9/2001 |

* cited by examiner

*Primary Examiner* — Sean P. Shechtman  
*Assistant Examiner* — Chad Rapp  
(74) *Attorney, Agent, or Firm* — Christopher & Weisberg, P.A.

(57) ABSTRACT

A process in an electro-mechanical system having a plurality of controllable components, is controlled by: (a) storing component objects each corresponding to a component and having activation and/or feedback data for that component; (b) storing operation objects each referencing an operation to be carried out on a component and a pointer to the relevant component object; (c) storing process steps each referring to operation objects; and (d) sequentially processing process steps, by: following each reference to an operation object to determine the operation type and the component object, and performing a data operation to be component object to cause the operation to be carried out on the relevant component. In this way, a system controller can be used to activate components in dependence on the activation state of corresponding component objects and to update the feedback states of component objects in dependence on signals received from the components.

16 Claims, 6 Drawing Sheets

PROCESS CONTROL METHOD

CROSS-REFERENCE TO RELATED APPLICATIONS

This application is a Submission Under 35 U.S.C. §371 for U.S. National Stage Patent Application of International Application Number: PCT/EP2007/054634, filed May 14, 2007, entitled "PROCESS CONTROL METHOD" which claims priority to Irish Application No. S2006/0391, filed May 15, 2006, the entirety of which are incorporated herein by reference.

TECHNICAL FIELD

This invention relates to the control of processes in all types of plants and electro-mechanical systems and to methods, computer systems and computer programs for controlling such processes.

BACKGROUND ART

Conventional control systems employ an industrial programmable controller, known as a PLC (Programmable Logic Controller) and the program written for the specific control application. These programs are generated using low-level machine code type language editors or higher level editors which often provide a graphical platform for linking aspects of the system.

Common repeatable functions can be utilised in both cases by using paramaterisable routines, with each instance use of the function represented by a call of the function to carry out required examination or operation on the items specified by the parameters assigned to the call of the function. The advantage of this is that the routine code does not require full testing and validation in each call instance.

Conventional PLC code generation, therefore, is accomplished using either low level or high level editors. While it might appear that some of the high level editors do not produce PLC code, such editors will produce code which itself compiles to produce the PLC code.

DISCLOSURE OF THE INVENTION

The invention provides a method of computer controlling a process in an electro-mechanical system having a plurality of controllable components, the method comprising:
 (a) storing a plurality of component objects each corresponding to one of said components and comprising data which is indicative of an activation state and/or a feedback state of the component to which it relates;
 (b) storing a plurality of operation objects each comprising an indication of an operation type to be carried out in relation to a component and a reference to a component object identifying said component;
 (c) storing a plurality of process steps each of which comprises a reference to one or more of said operation objects; and
 (d) sequentially processing a plurality of said process steps, each process step being processed by:
  (i) following the or each reference to an operation object,
  (ii) determining from the operation object the operation type and the component object referenced by said operation object; and
  (iii) performing a data operation on said component object effective to cause said operation to be carried out in relation to said identified component;
whereby a system controller can be used to address said components in order to activate components in dependence on the activation state of corresponding component objects and to update the feedback states of component objects in dependence on signals received from said components.

As used herein, "electro-mechanical system having a plurality of controllable components" includes bespoke systems such as liquid material processing plants, plants, conveying systems, power generation plants, bulk handling plants (such as for milling or crushing bulk material), refining systems, fermentation systems, reactors, airfield lighting systems, energy management systems, building management systems and powder dryers. The term also includes systems which are built by an Original Equipment Manufacturer to a common general design requiring final modifications to suit particular orders, such as filling machines, blending systems, centrifuges, separators, homogenisers, packaging machines, and sterilising tunnels. The term does not embrace mass-produced or consumer goods which would not require dedicated programmable controllers to be programmed and configured in order to satisfactorily operate them.

As discussed above, conventional computer control methods employ PLC code which is written specifically to control every step of operation of a PLC controller. The code specifies the circumstances in which devices are activated and addresses the devices to be activated.

In contrast, the present invention operates by means of software objects (component objects and operation objects), with component objects being objects which reference a field electrical or bus-based device or instrument, and operation objects being objects which reference an internal controller based memory function. To put it another way, operation objects reference operations and the component objects on which the operations in question are carried out. Process steps include pointers to the operation objects. This means that the code for processing the process steps can be universal and significantly simplified when compared to customised code for controlling a PLC. While the present invention may be implemented using a PLC, the control system could equally be PC-based, or a combination of a conventional PC and a PLC might be employed.

In addition to processing of process steps and the operation and component objects referenced by the method steps, the system controller also processes the various components of the system and examines in turn the objects associated with those components, taking any necessary actions to activate components which are flagged for activation, and updating the feedback state of components which have a feedback state.

The result of this is that the programming of the control method becomes much more configurable to a wide range of electro-mechanical system types and processes, and the process control program can be modified more easily. Data objects can be set up for each of the components of the electro-mechanical system, and generic operation objects can then be duplicated for each instance where a device needs to be activated or a condition within the system needs to be checked.

Preferably, the process steps are grouped in phases each comprising one or more of said process steps, and the phases each include an identification of a set of said controllable components on which the operations defined by the process steps are to be carried out.

The term "phase" as used herein is intended to denote a sequence of steps to implement a process. The phase may implement a complete process or the process which the phase implements may be part of a larger process. A "phase" in this sense might also be referred to as a "program" whereby a number of different programs can be run within an overall electro-mechanical system (or sometimes, a single program will describe the entire process in a simpler electro-mechanical system).

In this way, each phase can deal with a few subsystems of the overall system, and this intermediate distinction between method steps and the complete process is useful for allowing duplication and re-use of aspects of phases of a process at various stages of a process and in various areas of an electro-mechanical system. The particular area of the electro-mechanical system in which the phase is intended to be carried out can be specified by this identification of the set of components involved.

Preferably, the phases further comprise an indication of parameters to be employed during the processing of the process steps of the phase.

Again this allows a phase of, for example, "heating a solution" to be duplicated for different parts of an electro-mechanical system or a process, with parameters such as temperature setpoint and prescribed step duration being specified for each instance where the heating of an solution is being carried out. The individual process steps and operation objects can access these parameters to operate the correct regime for that particular heating step.

Further, preferably, the phases further comprise an indication of variables to be employed during the processing of the process steps of the phase.

The distinction between "parameters" and "variables" as used herein is that parameters are supplied from an external source or pre-set during configuration and are not modified by the process; variables however, are available to be modified, for example the contents of a parameter can be transferred to, or form part of, a variable, but not the other way around.

The method also allows, in preferred embodiments, the step of storing a plurality of "abstract steps" each comprising a reference to one or more abstract operation objects, the abstract operation objects defining an operation to be carried out on data without directly employing the component objects.

It is recognised that not every step of a process will involve operations on component objects. Abstract steps complement the process steps which directly involve components, by allowing manipulation of numbers, data and variables to provide useful results in later stages of the process. Such abstract steps include the "tasks" and the "combined conditions" referred to below.

If a method includes abstract steps, and the phases of the method include reference to parameters and variables, the abstract operation objects preferably define one or more operations to be carried out on data such as manipulating the variables and the parameters.

As an example, the value of a variable can be set to different parameters for different process steps, and this can be accomplished by abstract operation objects in abstract steps. Similarly, feedback values from instruments within the system can be mathematically manipulated with parameters and variables to provide useful results.

Preferably, one or more of the operation types is a device activation.

Further, preferably, one or more of the operation types is a determination of a feedback state of a component and the recordal of the result of the determination.

Preferably, the determination includes comparing the feedback state to a predetermined condition and recordal includes an indication of whether the predetermined condition is met.

In preferred embodiments, one or more of the operation types is a conditional device activation whereby a device is activated in dependence on the feedback state recorded as a result of a determination.

The method of the invention preferably further comprises periodically reviewing the component objects in sequence, activating the components when required according to the activation states of the component objects and updating the feedback states of the component objects in dependence on signals received from the components.

In this way, two routines can be run in conjunction, in alteration, or in parallel: a first routine processes process steps, follows the references to operation objects in those steps, and operates on the component objects referenced in the operation objects, as described previously, while a second routine interfaces between the component objects and the physical components which those objects represents, reading signals from and writing signals to those components.

When the method includes phases and those phases identify sets of components on which they act, the method preferably further comprises the step of storing an indication of units of component objects corresponding to functionally linked components forming subsystems within the mechanised system, whereby the identification of a set of controllable components in a phase comprises an identification of one or more of the stored units.

Thus, rather than simply listing every component as a reference for a phase, the components are pre-grouped into functional units, and these units of components are referenced. An example of a unit of associated components would be a liquid holding tank, the inlet valve, outlet valve, level sensors and alarms, the heating elements in that tank, and the pressure sensor within the tank. By referencing the unit, the phase could implicitly involve any or all of the components of the group. Furthermore, when a phase is actively processing any device in that unit, every other phase can be locked out from accessing that unit.

In another aspect the invention provides a computer program product comprising instructions which when executed in a computer for controlling a process in an electro-mechanical system having a plurality of controllable components, are effective to cause said computer to:
  (a) store a plurality of component objects each corresponding to one of said components and comprising data which is indicative of an activation state and/or a feedback state of the component to which it relates;
  (b) store a plurality of operation objects each comprising an indication of an operation type to be carried out in relation to a component and a reference to a component object identifying said component;
  (c) store a plurality of process steps each of which comprises a reference to one or more of said operation objects; and
  (d) sequentially process a plurality of said process steps, each process step being processed by:
    (i) following the or each reference to an operation object,
    (ii) determining from the operation object the operation type and the component object referenced by said operation object; and
    (iii) performing a data operation on said component object effective to cause said operation to be carried out in relation to said identified component;
  whereby a plant controller can be used to address said components in order to activate components in dependence on the activation state of corresponding component objects and to update the feedback states of component objects in dependence on signals received from said components.

The invention also provides a computer programmed to control a process in an electro-mechanical system having a plurality of controllable components, the computer comprising:

a component object storage area for storing a plurality of component objects each corresponding to one of said components and comprising data which is indicative of an activation state and/or a feedback state of the component to which it relates;

an operation object storage area for storing a plurality of operation objects each comprising an indication of an operation type to be carried out in relation to a component and a reference to a component object identifying said component;

a process step storage area for storing a plurality of process steps each of which comprises a reference to one or more of said operation objects; and a processor programmed to sequentially process a plurality of said process steps, each process step being processed by:

(i) following the or each reference to an operation object, (ii) determining from the operation object the operation type and the component object referenced by said operation object; and (iii) performing a data operation on said component object effective to cause said operation to be carried out in relation to said identified component;

whereby a plant controller can be used to address said components in order to activate components in dependence on the activation state of corresponding component objects and to update the feedback states of component objects in dependence on signals received from said components.

In one embodiment, the computer is implemented as a dedicated plant controller.

In another embodiment, the computer is implemented as a general purpose computer communicating with a plant controller.

BRIEF DESCRIPTION OF THE DRAWINGS

The invention will now be further illustrated by the following description of embodiments thereof given by way of example only, with reference to the accompanying drawings, in which.

DETAILED DESCRIPTION OF PREFERRED EMBODIMENTS

Figure 1:
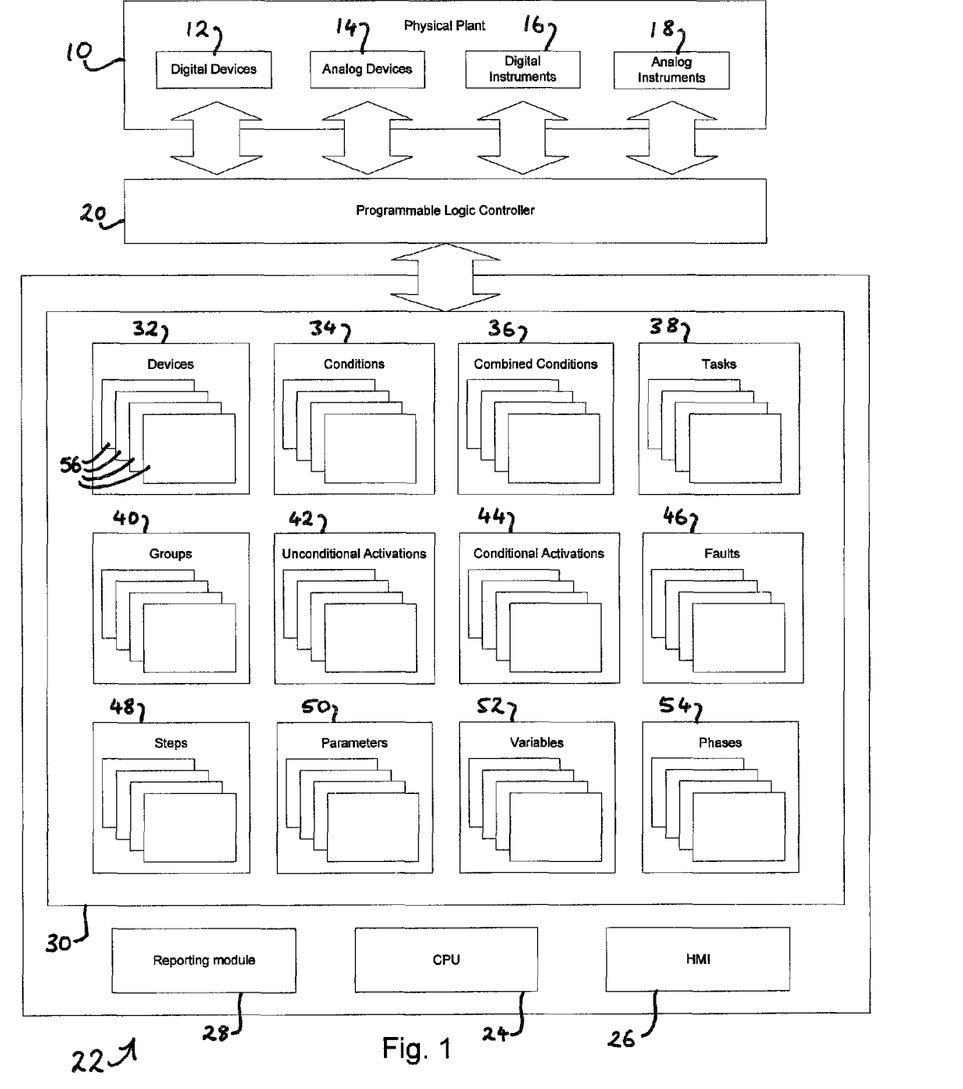
FIG. 1 is a schematic block diagram of an electro-mechanical system architecture incorporating a system according to the invention.

FIG. 1 is a block diagram showing the systems used to control the operation of a physical plant 10. The plant itself comprises a number of digital devices 12, analog devices 14, digital instruments 16 and analog instruments 18.

As used herein, "digital devices" refers to devices such as valves and motors known in the art as individual control modules (ICMs) having two output or activation states (on/off, or 1/0). These states correspond to the presence or not of an electrical signal activating the device, i.e. which are driven to a digital value corresponding to one of two electrical signals provided by a PLC 20 (one such signal can of course be zero). Such devices generally also provide feedback or input states of on/off or 1.0, indicating the actual state of the device. Simper digital devices such as solenoids may not be provided with feedback or input states and may simply have a digital output or activation state.

As used herein, "analog devices" refers to devices which operate on a variable output, i.e. which are driven to a variable value corresponding to a variable electrical signal provided by PLC 20. The value of the electrical signal to which an analog device is driven at any time is referred to as its "setpoint". This can be manually fixed or it can be set to various different values at different points during the process according to the control logic which controls the process. Examples of analog devices are control valves, variable speed drives and pumps, and modulating motors.

As used herein, "digital instruments" refers to components providing digital inputs from the mechanised system to the control system which are indicative of a condition or state within the plant. The feedback or input provided by such an instrument is 0 or 1, corresponding to a predefined electrical state, and examples of such digital inputs are temperature switches and flow switches. Digital inputs can also include any other Boolean plant state sensors. Digital inputs may be accorded a switching or hysteresis time to avoid multiple switching of result states at a threshold value due to fluctuating levels.

As used herein "analog instruments" refers to plant instruments and sensors providing a variable electrical signal indicative of a condition or state within the plant. Examples of analog inputs are flow transmitters and pressure transmitters. Setpoints can be accorded to analog instruments so that they provide alarm signals when the measured value is above or below a threshold set manually or by the process controller.

The interaction of PLC 20 and the physical plant is well known and operates briefly as follows. Each instrument and device is accorded an address. This address corresponds to a particular channel on a particular I/O (input/output) card on a particular rack or node on the PLC network. The addresses are unique for their function, i.e. there is only one digital output of address a.b or one analog input of address xyz, where a,b,x,y,z are bounded integers. The address of each item is contained in the object data.

Thus when an instrument or device 12,14,16,18 is to be read or activated, the PLC 20 is instructed to examine or affect the electrical base state of the channel referenced by the address. The card holding the referenced channel may be located in the same "rack" subsystem as the Central Processing Unit card of the controller, or the card may be located in a "remote" or "extension" rack or node, in which case bus based communication (multi-drop serial, Ethernet, telemetric) between the CPU and the remote rack is required.

Providing the addressing is unique as stated the operating system of the controller will address the correct channel, whether channel is located "centrally" or "remotely".

While the examples given above relate to the types of devices and instruments normally found in fluid handling plants, this is by way of example only and the skilled person will appreciate that the following description of control systems and methods is equally applicable to other types of processes requiring control within an electro-mechanical system of any type.

In contrast to conventional systems which program the PLC 20 with a program detailing the activations of devices and the measurements to be taken from instruments, the timings of various steps and the logic to be applied, the programmable logic controller 20 of the present invention is programmed with a main routine calling an equipment routine and a process routine. (It will be appreciated of course that "the controller" referenced as 20 may be a networked control system and not necessarily a single PLC per se).

The equipment routine comprises the following distinct modules of code:
Digital device routine.
Digital input routine.
Digital output routine.
Analog input routine.
Analog output routine.
Loop control
Unit routine.

Each of these routines processes all of the configured objects for that routine in turn, and each will be explained briefly.

Thus, the digital device routine will process each configured digital device in turn. It does this by loading the component object data stored for each digital device in a digital device data area. The device data for each device includes addresses for the device allowing the PLC to address the output and to obtain feedback or input from the device, data indicating how errors are to be determined, pointers to devices to be checked for interlock conditions, indications of the electrical signal to be applied, and various flags indicating special conditions or states of the device. As will be described further below, when a device is to be activated, a flag is set in the device object and this flag is picked up by the PLC during the digital device routine, causing the device to then be activated according to the flag (or, if the device is already in the state required by the flag, the digital device routine checks its feedback state and takes no action).

The digital input routine operates in similar manner, loading the object data for each digital input or instrument from a digital input data area, performing the required operations and restoring the modified data to the digital input data area. The operations performed include reading the digital input state from the device identified in the digital input data, reading from the object the values which are the setpoints for the electrical signal to be treated as true/false (or on/off); comparing the measured electrical signal from the device with these factors and writing the result to the object associated with the digital input. The modified data (object) is then restored to the digital input data area.

The digital output routine is similar to the digital device routine, but digital outputs are distinguished by not having an electrical feedback (unlike digital devices, as the terms are used here).

The analog input and analog device routines operate in similar fashion to their digital counterparts, loading the data for each of the devices and instruments in turn, performing the operations required to set or activate the device or to read and interpret the input, and then restoring the modified data to the appropriate data area.

The loop controller routine is a standard feature of control systems. A loop controller provides a method of controlling an analog device such that a process operating parameter is maintained, despite changes in associated conditions. As an example, an analog input such as a thermometer may be monitored and compared to a setpoint, and an analog device such as a steam control valve can be varied in order to maintain the input within a desired range. The controller implements a general proportional integral derivative (PID) controller which performs the control of a setpoint for an analog device with respect to the setpoint, analog input and PID parameters assigned. Each such configured loop controller is processed in turn by loading the object data for the loop controller from an appropriate data area, performing the required operations and restoring the modified data.

The unit routine notes which units are specified for use by the phase and after checking that the component is not already in use, places each component of such units in a state such as "reserved for automatic". The unit routine of any other phase operating at the same time would note this state and would be locked out from accessing the unit. Similarly, any attempt to place any device within the unit in manual mode or in maintenance mode from the SCADA would be prevented. The SCADA can place idle units in a state such as "maintenance mode" or "manual override", and the unit routine would then be prevented from accessing this unit and would report an error.

Each of the routines can be configured to process any type of device according to any criteria which can be specified in the component object for that device. The programmable logic controller 20 simply needs to be provided with a routine to process components of that generic type and it will then check for each such software object, look at the inputs provided by the plant component addressed in each loaded object, and write the values (i.e. generate the electrical signals) specified for those devices where appropriate. Actual control of which devices to activate, and what should be done with measured feedback results and plant conditions, are performed externally to the equipment routine by the process routine which writes to and reads from the data (objects) for the various devices.

The control system which provides this process control is indicated generally at 22. The system can be implemented as a general computer program specifically written for the task (soft PLC), or as a dedicated piece of electronics which is built to implement the functionality or as a combination or network of either. The computer may be a single computer or may be distributed as is well known in the art.

The system 22 has a CPU 24 which processes the various steps. A HMI or human machine interface 26 (also known as a supervisory control and data acquisition or SCADA system) is used to interface with the control system allowing manual control of devices and phases.

An optional reporting module 28 is provided to generate reports of aspects of the system and the process. A computer memory 30 which may be provided as volatile or non-volatile memory, as magnetic or optical storage, or as any other type of storage medium, includes a number of data blocks for storing data relating to devices 32, conditions 34, combined conditions 36, tasks 38, groups 40, unconditional activations 42, conditional activations 44, faults 46, steps 48, parameters 50, variables 52 and phases 54. Within each of these individual data storage areas are data areas relating to individual devices, conditions, etc.

Accordingly, taking the example of the devices data storage area 32, a representative number of data areas 56 are indicated to illustrate that this data storage area contains the data on all of the devices (this term being used generically to denote the devices or outputs on the instruments or input) making up the plant. Each set of device data is a software object (component object).

It is appropriate at this point to describe the data stored in the other data blocks, as an understanding of what each type of data represents is useful for an understanding of the operation of the system. This will be done hierarchically beginning with the overall phases of a process.

Phases (data block 54): the phases of a process are sequences of steps used to implement specific sub-processes within the plant. Each phase will usually be made up of a number of steps to be carried out in sequence according to the rules specified for that phase. The data for each phase specifies the units of equipment on which the phase is to operate (a unit being a collection of devices and instruments which are monitored and regulated functionally as a whole, such as a storage tank and its associated valves and sensors). A phase may operate on more than one equipment unit, such as a transfer phase which specifies a source tank, a destination tank and a transfer line connecting the two. As well as the indication of the steps and the units on which the phase is to operate, the phase will also specify the parameters and variables for that phase.

Variables (data block 52): variables are registers whose values can be modified, for example to control tasks (see below) or as variable setpoints for an analog output or a PID controller. A simple example of a variable would be a flow setpoint at which a pump is to operate. This variable might be set at a first given value where the pump was being used to pump water as part of a phase, and to another value where the pump was being used to pump a viscous syrup.

Parameters (data block 50): parameters are registers holding a setpoint value to be used as part of a process step. Examples of parameters would include a pressure alarm setpoint for a particular tank during a certain sequence of steps. Unlike variables, parameters are not modified during the process.

Steps (data block 48): a step (process step) is a collection of device activations (activations may be conditional or unconditional), tasks, faults or errors, conditions and combined conditions, all of which will be described below. An example of a step would be, as part of a transfer sequence between two tanks, the various conditions to be checked, errors to be avoided, and devices to be activated when flushing the transfer line with water as preparation for the actual product transfer.

Faults (data block 46): faults are those error states which are to be checked for and which will cause the operation of the steps or of the phase to be altered or aborted.

Conditions (data block 34): each condition is a comparison of values, examples of such values being analog inputs or analog device setpoints, parameters or variables. Thus, for example, a condition might specify that a tank low level sensor is to be checked. If the result of this check is that the liquid has dropped below the tank low level sensor, then the result of this condition would be recorded in a condition object. The result of this condition object is then available to other aspects of this system. In this way, the result might be used to control a device, such as to open a tank fill valve and restore the level of liquid in the tank. The results of conditions can also be combined with other conditions as will now be described.

Combined conditions (data block 36): combined conditions specify logic to be applied when various Boolean combinations of conditions are met. Taking the previous example of a detection of low liquid levels in a particular tank, this might be combined with a check for a condition of a low liquid level in a sister tank. If both tanks show a low level, then the process might terminate, whereas if only one tank shows a low level, then the process might continue until both tanks are shown as empty. Accordingly, the data for a combined condition will specify the conditions to be checked and the Boolean operations to be performed, and the result to be written when the Boolean logic provides particular outputs.

Tasks (data block 28): a task allows mathematical operations to be performed by the system. The result of the task may be used for writing values to analog or PID setpoints or for other tasks. Each task is made up of operands and a mathematical operator, and temporary or intermediate registers or variables can be used to provide the function of combining tasks to produce a formula. Examples of the operators include the various arithmetical operators, logarithmic operators, trigonometric operators, square roots, and so on.

As an example of a mathematical task, assume an error check is to be performed on a liquid flow rate measured by an analog flow transmitter (to avoid shearing of the liquid at a molecular level). Assume the flow rate cannot exceed 120% of the "product flow setpoint" parameter. We could implement this error check with the following:

Parameters: "product flow setpoint", "max flow percentage" (value=120), "constant 100" (this as one would expect is a parameter defining a constant value=100)
Variables: "Max flow actual stage 1", "max flow actual"
Task 1: Set Max Flow Actual stage 1="product flow setpoint"*"max flow percentage"
Task 2: Set "Max Flow Actual"="Max Flow actual stage 1"\"Constant 100"
Condition: Compare output value from flow transmitter to "max flow actual"

Unconditional activations (data block 42): the unconditional activations specify quite simply that analog or digital devices are to be activated at particular points during a step. The list of unconditional activations for a particular step will contain pointers to the devices to be unconditionally activated. The automatic activation flags for the required component objects are set accordingly. A subset of unconditional activations (not shown separately in FIG. 1) are pulsed activations which include pointers to devices to be activated in a pulsed manner and the parameters of operation.

Conditional activation (data block 44): the conditional activations allow the application of logic as specified in the conditions and combined conditions, to be used to determine whether or not to activate devices. As an example, a conditional activation for a gas vent valve on a tank might contain a reference to activate that valve and to check the result of a condition. The condition object would be examined to see if the condition had been met (e.g. tank pressure value from a pressure sensor greater than a high pressure setpoint). If the condition is met, then the device is activated, venting gas from the tank.

Groups (data block 40): the devices and inputs stored as component objects in data block 32 comprise every single device and instrument in the plant. In order to allow phases and steps to be addressed to the correct combinations of devices, the components are grouped together in groups. This will be explained further below with reference to the example of FIG. 2.

Figure 2:
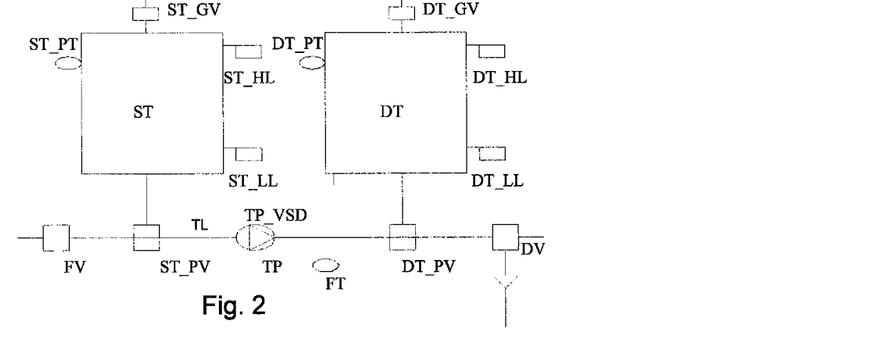
FIG. 2 is a block diagram of a simple plant used to exemplify the invention.
Figure 3:
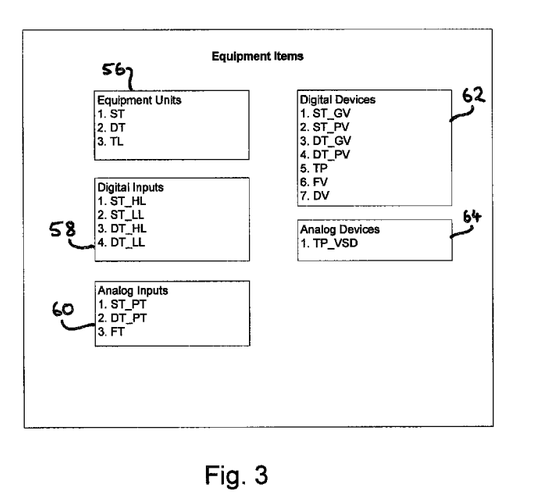
FIG. 3 is a block diagram illustrating the items of equipment of the plant of FIG. 2.

Referring now to FIG. 2, an example is given of a small section of an electro-mechanical system in the form of a liquid handling plant comprising a source tank ST, a destination tank DT, and a transfer line TL. The complete list of items of equipment in the system is provided in the block diagram of FIG. 3. The abbreviations used in FIGS. 2 and 3 are as follows:

| List of Equipment Units 56 | | |
|---|---|---|
| 1 | ST | Source Tank |
| 2 | DT | Destination Tank |
| 3 | TL | Transfer Line |

| List Of Digital Inputs 58 | | |
|---|---|---|
| 1 | ST_HL | ST High Level Sensor |
| 2 | ST_LL | ST Low Level Sensor |
| 3 | DT_HL | DT High Level Sensor |
| 4 | DT_LL | DT Low Level Sensor |

| List of Digital Devices 60 | | |
|---|---|---|
| 1 | ST_GV | ST Gas Valve |
| 2 | ST_PV | ST Product Valve |
| 3 | DT_GV | DT Gas Valve |
| 4 | DT_PV | DT Product Valve |
| 5 | TP | TL Transfer Line |
| 6 | FV | TL Flush Valve |
| 7 | DV | TL Drain Valve |

| List of Analog Inputs 62 | | |
|---|---|---|
| 1 | ST_PT | ST Pressure Transmitter |
| 2 | DT_PT | DT Pressure Transmitter |
| 3 | FT | TL Flow Transmitter |

| List of Analog Devices 64 | | |
|---|---|---|
| 1 | TP_VSD | TP Variable Speed Drive |

The system shown in FIG. 2 would normally form part of a larger plant. However, to illustrate its operation, a simple description of a phase will be given which involves only the system of FIG. 2 in isolation. The described phase is a transfer phase, to effect the transfer of product from the source tank ST to the destination tank DT via the transfer line TL.

The transfer is to occur in five steps. The transfer line TL is to be flushed with water (from flush valve FV to drain valve DV) before and after the product transfer. No product is to be sent to drain. The pressure in the source tank is to be monitored and gas is to be supplied to the tank to maintain a minimum required pressure. The pressure in the destination tank is to be monitored and gas recovered to maintain a maximum required pressure. The program must check that pressures do not exceed alarm points. The program must check that the low level in the source tank is covered and the high level in the destination tank is uncovered at all times.

Figure 4:
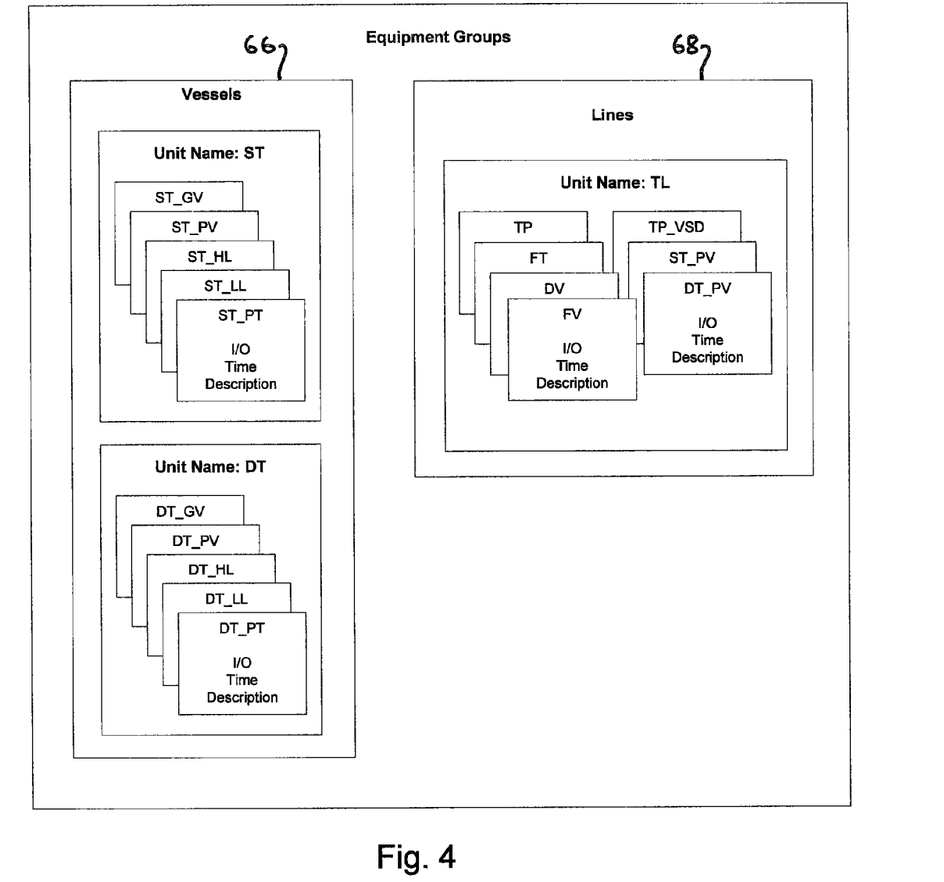
FIG. 4 is a block diagram illustrating the data maintained for the equipment groups of the plant of FIG. 2.

In order to properly target the various steps at the appropriate pieces of equipment and individual devices and instruments, various equipment groups are defined. There are two generic types of equipment group for this plant, as indicated in FIG. 4. These generic types are vessels 66 and lines 68. To configure the system, therefore, the source tank ST and destination tank DT are placed into the vessels area, and the transfer line TL is placed into the lines area.

Then the various valve sensors and transmitters are associated with the appropriate units. Thus, for example, it can be seen that the source tank gas valve ST_GV, source tank product valve ST_PV, source tank high level sensor ST_HL, source tank low level sensor ST_LL and source tank pressure transmitter ST_PT are all associated with the source tank unit. For each of these, data including the input and output addresses, and the time setpoints for activation and error checking are stored in the device data.

The primary use of units is for safety—to ensure that only one phase can utilise a piece of equipment at any time, to ensure that all devices in the unit can not be activated manually if a phase is using the unit, to ensure that a device placed in "maintenance" mode causes related devices to be "affected by maintenance" and thus disabled from activation. For example, when a fitter is replacing a valve body the entire unit can be placed in maintenance mode, and thus flagged as unavailable for use by any phase. This prevents a phase opening an adjacent valve while the fitter is at work. A stand-alone machine might be configured as a single unit, to mutually exclude automated operation, manual operation, and maintenance.

The corresponding items DT_GV, DT_PV, DT_HL, DT_LL, DT_PT are inserted for the destination tank as shown, and in the transfer line group, the transfer pump TP, flow transmitter FT, drain valve DV, flush valve FV, variable speed drive TP_VSD, product valve for both the source tank ST_PV and destination tank DT_PV are inserted.

It is to be noted that the product valves for the source tank (ST_PV) and destination tank (DT_PV) are associated both with the tank and with the transfer line between which they provide a valved connection. It is in this way that the functional connection between the source tank, the transfer line and the destination tank is maintained.

Figure 5:
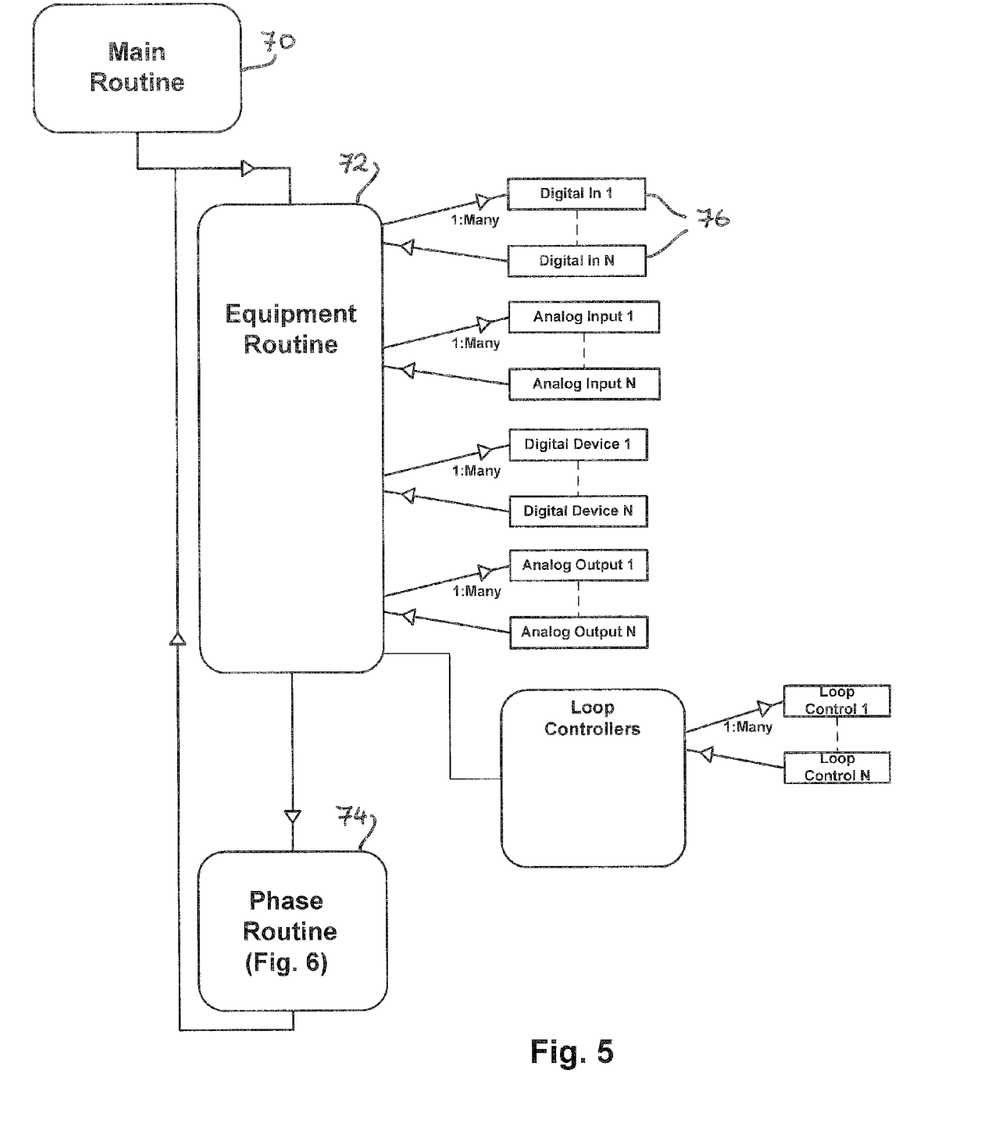
FIG. 5 is a flowchart illustrating the operation of an equipment routines called from a main routine for operating the plant.

The overall operation of the main routine (which calls the equipment routine and phase routine) is shown in FIG. 5, which also details the operation of the equipment routine itself (the phase routine mentioned in FIG. 5 is itself detailed in FIGS. 6-10).

As shown in FIG. 5, the main routine 70 loaded into the PLC 20 calls two sub-routines, namely the equipment routine 72 and the phase routine 74. In use the PLC will call the equipment routine, processing that fully (i.e. each device and input specified, and then the phase routine will be processed fully as described below, following which the method iterates back to the equipment routine, and so on.

The equipment routine has been described previously and comprises a repeating sequence of the operations: digital device routine, digital input routine, digital output routine, analog input routine, analog output routine, loop control (which may be implemented by referencing the inherent loop control functionality built into the PLC 20), and a unit routine (the latter is not explicitly shown in FIG. 5).

FIG. 5 shows that, taking the example of the digital input routine, each of the digital inputs 76 (nominally numbered from 1 to N) is updated in turn in the manner described above. The same then happens for each of the analog inputs (the number N simply denotes the last input sampled and is usually not the same number for the digital inputs and the analog inputs), and so on. On the next iteration, each input and device is again updated so that the state of the physical inputs (instruments) is correctly recorded in the corresponding software objects and the desired state of the physical devices is correctly implemented as set out in the respective software objects.

After each iteration of the equipment routine, each active phase is processed in the phase routine 74 as described below. This means that any changed inputs which affect one of the phases are picked up. If, during an iteration of the phase routine an output is changed (such as an instruction to activate a device) then this is picked up when the next iteration of the equipment routine occurs, and so the main routine alternates between the two. If an output is unchanged, then the PLC continues to apply the signal specified for that output.

Figure 6:
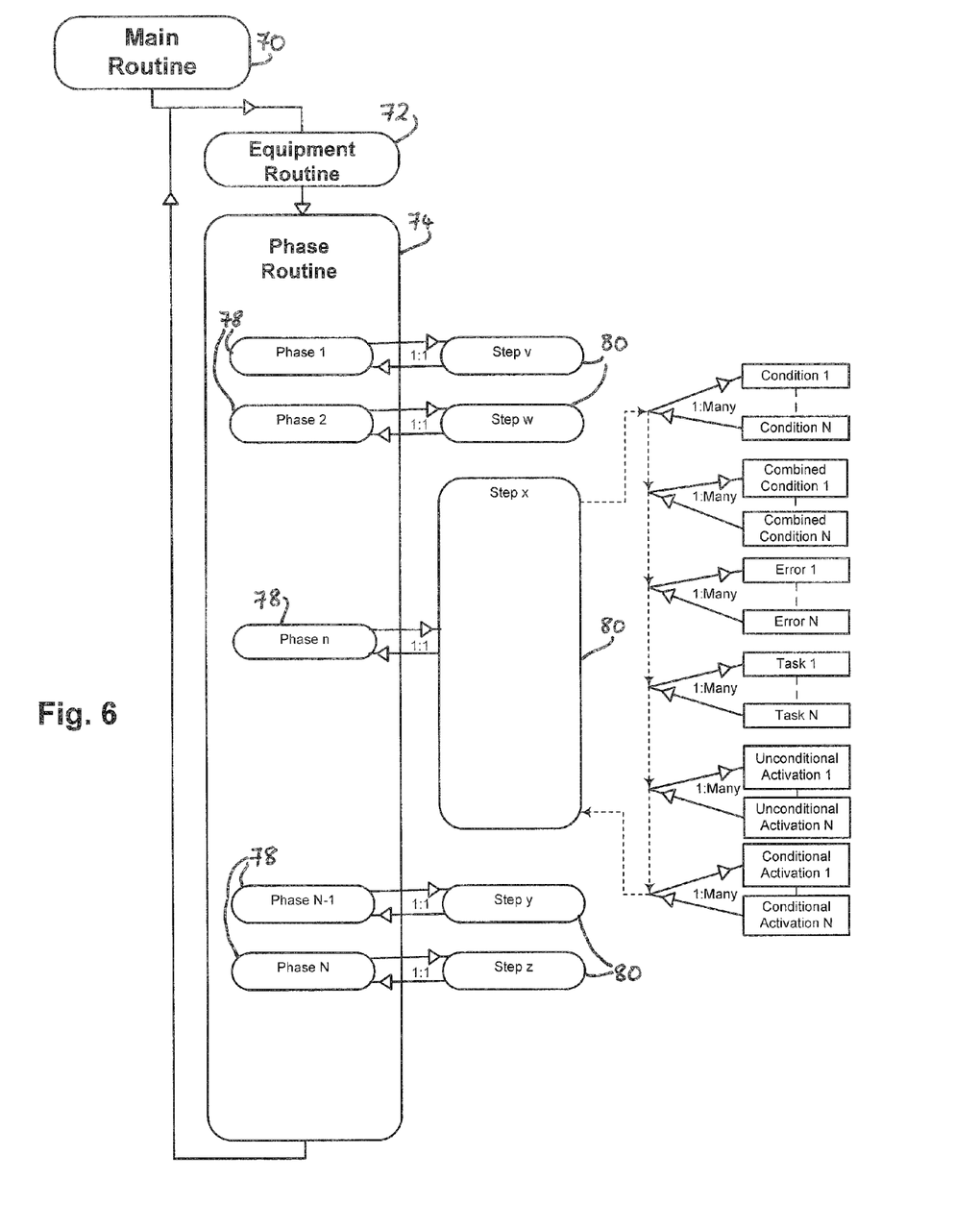
FIG. 6 is a flowchart illustrating the operation of a phase routine called from the main routine of FIG. 5 for operating the plant.

FIG. 6 shows the phase routine 74 called by the main routine 70. It indicates a number of phases 78 which are active and are numbered from phase 1 to phase N (i.e. all the phases which have been started from the HMI 26) including the particular phase being processed, phase n, at any given time when a snapshot of the phase routine is taken. (Thus, each phase from phase 1 to phase N will operate in the same manner as will now be described).

For each phase such as phase n, a list of steps is specified in the data maintained for that phase by denoting a starting step and a count of steps (e.g. start with step number 109 and count 5 steps). A pointer is maintained to the current active step. When any given step is completed the pointer for that phase moves on to the next step until the last of the specified steps is complete. The phase can also be moved to a step other than that in the normal recipe list. This is achieved by allowing for abnormal step transitions, e.g. when a condition is met, the next step is specified as being different from normal. This is important in the matter of sudden process faults (such as a pasteurizer temperature falling causing pasteurizer to be put into recirculation).

The phase routine, on each iteration, processes each active phase 78 by following the pointer to the current active step 80 for that phase and processing in turn all of the objects specified for that step. The objects to be processed in the illustrated embodiment of FIG. 6 are conditions, combined conditions, errors, tasks, unconditional activations (including pulsed activations) and conditional activations.

Accordingly, with reference to FIG. 6, suppose there are N phases 78 and each phase has a currently active step 80 denoted by an arbitrary letter: phase 1 has step v active, phase 2 has step w active, ... phase n has step x active, ... phase N-1 has step y active, step N has step z active. (Note that the labelling of the steps as v,w,x,y,z is arbitrary and does not indicate that the steps are consecutive in any sense. Indeed the steps will, as a rule be entirely unrelated, as phase 1 might refer to a filling operation on one tank while phase 2 might refer to a program for flushing a line in an entirely different part of the plant.

What FIG. 6 illustrates is that on each iteration, the phase routine looks at each active phase, and follows a pointer to a single active step for that phase. The 1:1 label means that the PLC, for each phase, follows the pointer, processes the single identified step, then reverts to the phase level where it moves onto the next phase and its active step.

Over time the particular active step for any phase will change, possibly after a single iteration (such as a step of actuating a valve when a condition occurs), but a step might equally remain active through many iterations (until a tank is filled, for example).

One of the steps, step x which is active for phase n, is indicated in more detail. When the pointer to this step is followed, the PLC will retrieve the step object 80 and this will reference the various conditions, combined conditions, etc. All of these are individual objects which are pointed to in lists referenced within the step object. So the PLC loads the step object, then each condition object for that step is loaded in turn and processed (as indicated by the "1:Many" labels). Then the combined conditions are processed in turn. This is followed by checks on all the errors, then all the tasks are processed, and so on. When the last of the conditional activations has been processed, the step is complete, and the PLC returns to the phase level to process the next phase and its associated active step.

Figure 7:
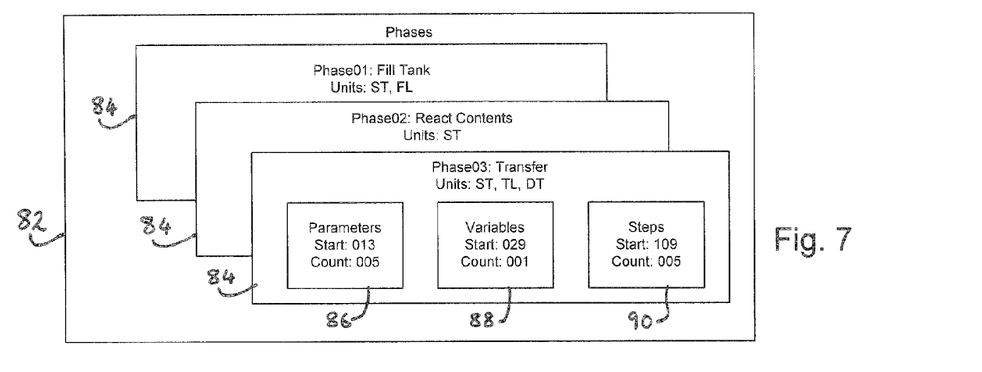
FIG. 7 is a block diagram representing the data maintained for each phase of a process.

Returning now to our specific example of the transfer operation between the source and destination tanks of FIG. 2, this is accomplished using a phase entitled "transfer". Referring additionally to FIG. 7, a schematic illustration of the contents of the phases data block is shown. There are three phases indicated for illustrative purposes, and the third of these (Phase03: Transfer) is the transfer phase with which this example is concerned. This transfer phase has the units ST, TL and DT associated with it, as described above, and has various parameters 86 referenced, has variables 88 referenced, and has a number of steps 90 referenced. (These are all referenced within separate lists by pointers to a start point within the respective list and by an indication of the number of items to count forward from that start point. For the transfer being described, the parameters might include the flow setpoint for the product, the flow setpoint for the flush step, the pressure setpoint for the source and destination tanks, the low flow alarm setpoint, the low pressure alarm setpoint for the source tank and the high pressure alarm setpoint for the destination tank. The variables associated with the transfer phase might be a single variable which is the flow setpoint for the pump. This can be set with the value for the product (obtained from the parameters) or the flow setpoint for the flush (also obtained from the parameters).

It then remains to carry out the individual steps defined for that phase. The list of steps shown in FIG. 7 identifies the first step of the phase as step 109 and the number of steps to be counted (i.e. 5 steps).

Figure 8:
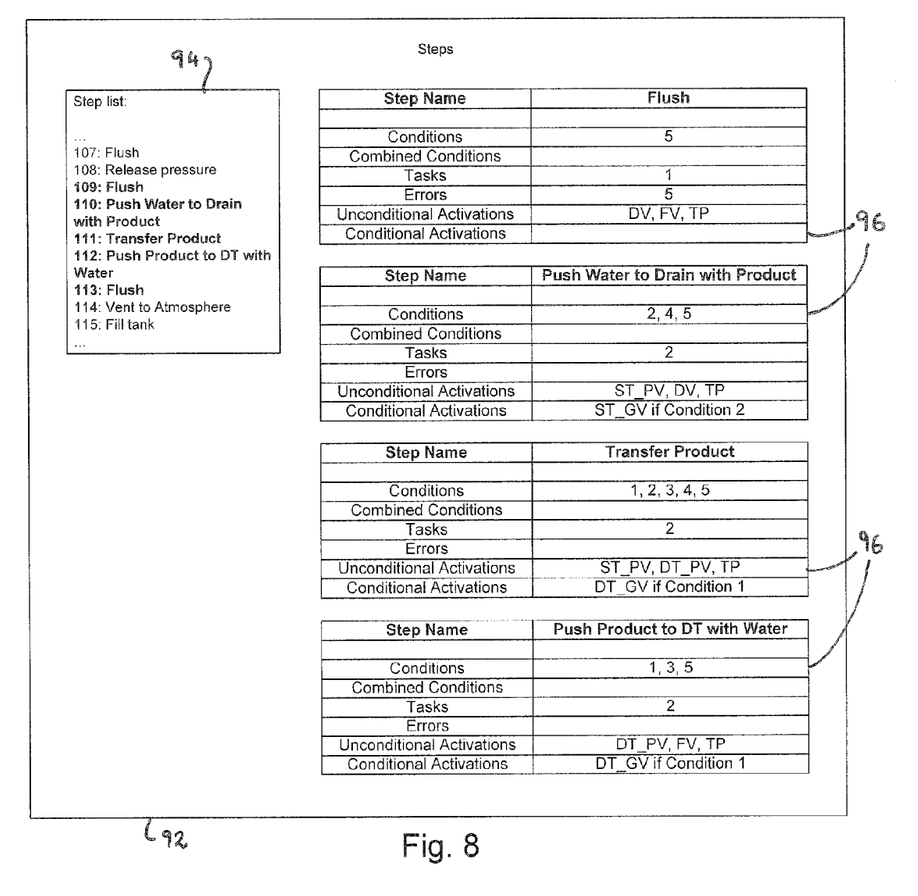
FIG. 8 is a block diagram representing the data maintained for the various steps of a phase of FIG. 7.

If additional reference is made to FIG. 8, the steps data block 92 is shown. This includes the step list 94, a portion of which shown in bold, to illustrate the particular steps associated with the transfer phase, beginning with "step 109: flush". Counting forward five steps, it can be seen that the last step in the phase is "113: flush". Accordingly, the same step ("flush") is carried out twice in this phase. Between the two flush steps, there is a step of "push water to drain with product", a step of "transfer product", and of "push product to DT [destination tank] with water".

Within the data 96 stored for each step (FIG. 8) there is an identification of the conditions are to be evaluated during that step, and combined conditions which are to be evaluated, the tasks which need to be carried out during that step, the errors which are to be monitored for, the devices which are to be subjected to unconditional activations, and the devices which are to be subjected to conditional activations.

During the running of a phase each step is generally processed, one at a time, according to the listing order in the recipe, as described above with reference to FIG. 6, until all steps are complete for the phase or until interrupted by a command from the SCADA-HMI (human machine interface). The actual processing of the active step is repeated on each iteration of the phases routine until the conditions for completing that step have been met, at which point the active step pointer for that phase is updated. When all steps are processed in that phase, the phase terminates.

In reference to FIG. 6, it was mentioned that the conditions, combined conditions, errors, tasks, unconditional activations and conditional activations are processed in turn for each active step. Each of these individual components of the step will now be described in more detail, with reference to the process of transferring liquid from ST to DT via TL in the simple system of FIG. 2.

First, all of the conditions referenced in the step are processed. The conditions are stored in a numbered list, and the list in the case of the present example is as follows:

1. Compare DT_PT to Pressure Setpoint for time
2. Compare ST_PT to Pressure Setpoint for time
3. Compare DT_PT to High Alarm Pressure Setpt for time
4. Compare ST_PT to Low Alarm Pressure Setpt for time
5. Compare FT to Low Flow Alarm Setpoint Thus, during the first step of the phase, the flush step, FIG. 8 shows that condition 5 is checked, i.e. the flow transmitter is compared to the low flow alarm setpoint. The reason for checking this condition is that the result needs to be known in order to determine subsequently whether or not one of the error conditions has occurred.

The tasks to be carried out are stored in a numbered list, which in the present example is as follows:

1. Transfer Water Flow setpoint to TP_VSD
2. Transfer Product Flow setpoint to TP_VSD Thus, for the flush step, the simple mathematical task is carried out of setting the variable TP_VSD to be equal to the parameter called "water flow setpoint". When that task has been carried out, any operation of the transfer pump will call on the variable value and thus the transfer pump will operate at the speed referenced by the value in the nominated variable register.

A check is then made that the error conditions are not met, and the error list specifies that an error has occurred if condition 5 is met.

Next, the unconditional activations are processed in turn. The devices which are to be unconditionally activated in the flush step, as specified in FIG. 8, are the drain valve, the flush valve, and the transfer pump. The various activation flags are thus set in the component objects for each of these devices to be activated, and this will have the result that the PLC will be informed that each of these devices is to be activated, during the next iteration of the equipment routine when the component object of each of the three devices is examined. The three devices will therefore be activated and water will be pumped through the transfer line between the flush and drain valves at the speed set in the variable speed drive for the transfer pump.

Next any conditional activations are carried out, and in the case of the flush step, there are no conditional activations defined.

Steps may be configured to end on duration or on a Boolean event such as a condition result or a digital input result or an analog input alarm point or setpoint. In the case of the flush step the step object will include a step duration register in the step object, so that the line is flushed for e.g. 10 seconds. Once that duration is complete, the pointer will be moved to step 110 in step list 94, namely "Push Water to Drain with Product".

Accordingly, on the following iteration of the phase routine, the "transfer" phase will be point to the same list of steps, but the pointer in this list will now point to step 110 and it is that step that will be processed.

This next step, pushing water to drain with product, involves checking for conditions 2, 4 and 5 above, and carrying out task no. 2 (i.e. setting the variable value for the variable speed drive to the value specified in the product setpoint parameter). The errors for this step are conditions 4 and 5: i.e. the PLC returns an error message if the low pressure alarm setpoint has been detected in the source tank, or if the flow rate is below the low alarm setpoint. The former condition should be avoided because of the conditional activation in this step (described below) and the latter condition should be avoided provided the transfer pump is operating correctly at the required rate and the line is full of fluid. However, as valves can stick and pumps can break, it is necessary to check that the flow rate is within acceptable limits and that is the reason for that error.

The unconditional activations required to carry out this step are that the source tank product valve should be opened, the drain valve should be opened and the transfer pump is to be operated (according to the speed set in the TP_VSD variable). In this case, the drain valve is already opened and the flag is thus correctly set already, so no change is made to the component object for the drain valve.

In the final part of this step, a conditional activation must be carried out. This conditional activation specifies that the source tank gas valve is to be opened if condition 2 is met. It will be recalled that it was specified in the initial description of this process that the pressure in the source tank must be monitored and gas supplied to the tank to maintain a minimum required pressure. Accordingly, since product is now being transferred from the source tank, the purpose of this conditional activation is to check whether the condition has been met (pressure less than specified minimum) and if so, to activate the gas valve and admit more gas. The setpoint at which this will occur is a pressure above the low pressure alarm setpoint (condition 4), and so it can be seen that in a correctly operating system a drop in pressure within the source tank should be remedied by the conditional activation before the alarm point is reached.

Because condition 2 is checked during each iteration of the equipment routine, i.e. the pressure in the source tank is compared with the parameter for the minimum pressure setpoint, the condition object for condition 2 is kept updated to reflect a value of false if the pressure is greater than the allowed minimum, and a value of true when it has dropped below this allowed minimum. Thus when the step is being processed and the conditional activation object is loaded, a pointer to condition 2 returns a value of either true or false, and this result determines if the activation flag should be set in the component (digital device) object for the gas valve on the source tank.

The process continues in this way, following through each of the steps for transfer product, push product to destination tank with water, and the final flush step, and when this last step is carried out (i.e. the fifth step, counting from step 109, according to the list maintained for phase 03: transfer), then the phase is complete. The overall process routine of FIG. 5 will only operate on active phases and will report back to the SCADA when any phase is complete, so that the phase can be marked inactive. It is possible to implement the system so that individual phases are linked functionally, with one phase calling another to implement a fully automated plant, but in the described embodiment the phases are started by human command from the SCADA.

The invention is not limited to the embodiments set out above which may be modified or varied without departing from the scope of the claimed invention.

The invention claimed is:

1. A method of computer controlling a process in an electro-mechanical system having a plurality of controllable components, the method comprising:
    (a) storing a plurality of component objects each corresponding to one of said components and comprising data which is indicative of an activation state and/or a feedback state of the component to which it relates;
    (b) storing a plurality of operation objects each comprising an indication of an operation type to be carried out in relation to a component and a reference to a component object identifying said component;
    (c) storing a plurality of process steps each of which comprises a reference to one or more of said operation objects; and
    (d) sequentially processing a plurality of said process steps, each process step being processed by:
        (i) following the or each reference to an operation object,
        (ii) determining from the operation object the operation type and the component object referenced by said operation object; and
        (iii) performing a data operation on said component object effective to cause said operation to be carried out in relation to said identified component;
    whereby a system controller is configured to address said components in order to activate components in dependence on the activation state of corresponding component objects and to update the feedback states of component objects in dependence on signals received from said components.

2. The method of computer controlling a process as claimed in claim 1, wherein the process steps are grouped in phases each comprising one or more of said process steps, and the phases each include an identification of a set of said controllable components on which the operations defined by the process steps are to be carried out.

3. The method of computer controlling a process as claimed in claim 2, wherein the phases further comprise an indication of parameters to be employed during the processing of the process steps of the phase.

4. The method of computer controlling a process as claimed in claim 2 or 3, wherein the phases further comprise an indication of variables to be employed during the processing of the process steps of the phase.

5. The method of computer controlling a process as claimed in claim 2, further comprising the step of storing an indication of units of component objects corresponding to functionally linked components forming subsystems within the mechanised system, whereby the identification of a set of controllable components in a phase comprises an identification of one or more of the stored units.

6. The method of computer controlling a process as claimed in claim 1, further comprising the step of storing a plurality of abstract steps each comprising a reference to one or more abstract operation objects, the abstract operation objects defining an operation to be carried out on data without directly employing the component objects.

7. The method of computer controlling a process as claimed in claim 6, wherein the phases further comprise an indication of parameters or variables to be employed during the processing of the process steps of the phase, and wherein the phases of the method reference said parameters or variables, and wherein the abstract operation objects define one or more operations to be carried out on said parameters or said variables.

8. The method of computer controlling a process as claimed in claim 1, wherein one or more of the operation types is a device activation.

9. The method of computer controlling a process as claimed in claim 1, wherein one or more of the operation types is a determination of a feedback state of a component and the recordal of the result of the determination.

10. The method of computer controlling a process as claimed in claim 9, wherein the determination includes comparing the feedback state to a predetermined condition and recordal includes an indication of whether the predetermined condition is met.

11. The method of computer controlling a process as claimed in claim 1, wherein one or more of the operation types is a conditional device activation whereby a device is activated in dependence on the feedback state recorded as a result of a determination.

12. The method of computer controlling a process as claimed in claim 1, further comprising periodically reviewing the component objects in sequence, activating the components when required according to the activation states of the component objects and updating the feedback states of the component objects in dependence on signals received from the components.

13. A non-transitory computer program product comprising instructions which when executed in a computer for controlling a process in an electro-mechanical system having a plurality of controllable components, are effective to cause said computer to:
    (a) store a plurality of component objects each corresponding to one of said components and comprising data which is indicative of an activation state and/or a feedback state of the component to which it relates;
    (b) store a plurality of operation objects each comprising an indication of an operation type to be carried out in relation to a component and a reference to a component object identifying said component;
    (c) store a plurality of process steps each of which comprises a reference to one or more of said operation objects; and
    (d) sequentially process a plurality of said process steps, each process step being processed by:
        (i) following the or each reference to an operation object,
        (ii) determining from the operation object the operation type and the component object referenced by said operation object; and
        (iii) performing a data operation on said component object effective to cause said operation to be carried out in relation to said identified component;
    whereby a plant controller is configured to address said components in order to activate components in dependence on the activation state of corresponding component objects and to update the feedback states of component objects in dependence on signals received from said components.

14. A computer programmed to control a process in an electro-mechanical system having a plurality of controllable components, the computer comprising:
    a component object storage area for storing a plurality of component objects each corresponding to one of said components and comprising data which is indicative of an activation state and/or a feedback state of the component to which it relates;
    an operation object storage area for storing a plurality of operation objects each comprising an indication of an operation type to be carried out in relation to a component and a reference to a component object identifying said component;

a process step storage area for storing a plurality of process steps each of which comprises a reference to one or more of said operation objects; and a processor programmed to sequentially process a plurality of said process steps, each process step being processed by:

(i) following the or each reference to an operation object, (ii) determining from the operation object the operation type and the component object referenced by said operation object; and (iii) performing a data operation on said component object effective to cause said operation to be carried out in relation to said identified component;

whereby a plant controller is configured to address said components in order to activate components in dependence on the activation state of corresponding component objects and to update the feedback states of component objects in dependence on signals received from said components.

15. The computer as claimed in claim 14, when implemented as a dedicated plant controller.

16. The computer as claimed in claim 14, when implemented as a general purpose computer communicating with a plant controller.

* * * * *